(12) United States Patent
Shao et al.

(10) Patent No.: US 12,529,454 B2
(45) Date of Patent: Jan. 20, 2026

(54) METHODS, SYSTEMS, AND MEDIA FOR GAS PIPELINE SAFETY MONITORING BASED ON REGULATORY INTERNET OF THINGS

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Yunbai Chen, Chengdu (CN); Lei Zhang, Chengdu (CN); Lei He, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 19/074,504

(22) Filed: Mar. 10, 2025

(65) Prior Publication Data
US 2025/0207739 A1    Jun. 26, 2025

(30) Foreign Application Priority Data
Dec. 3, 2024   (CN) .......................... 202411756628.4

(51) Int. Cl.
  *F17D 5/06*   (2006.01)
  *F17D 5/00*   (2006.01)
(52) U.S. Cl.
  CPC .............. *F17D 5/06* (2013.01); *F17D 5/005* (2013.01)
(58) Field of Classification Search
  CPC ................................. F17D 5/06; F17D 5/005
  (Continued)

(56) References Cited

U.S. PATENT DOCUMENTS

2020/0309632 A1* 10/2020 Shao ...................... G01D 18/00
2021/0215568 A1*  7/2021 Hori ...................... G01M 3/243
(Continued)

FOREIGN PATENT DOCUMENTS

CN    103307447 B    6/2015
CN    109239265 B    1/2021
(Continued)

OTHER PUBLICATIONS

First Office Action in Chinese Application No. 202411756628.4 mailed on Jan. 15, 2025, 18 pages.
(Continued)

*Primary Examiner* — Shelby A Turner
*Assistant Examiner* — Xiuqin Sun
(74) *Attorney, Agent, or Firm* — METIS IP LLC

(57) ABSTRACT

A method, a system, and a medium for gas pipeline safety monitoring based on a regulatory Internet of Things (IoT) are provided. The method includes: obtaining a first vibration sequence based on vibration data uploaded by a plurality of pipeline monitoring devices; obtaining construction information corresponding to each pipeline region, and determining a second vibration sequence based on the construction information and the first vibration sequence; receiving feedback information from a people user platform; identifying a suspected leak point location based on the feedback information and the second vibration sequence; generating, based on the suspected leak point location, a maintenance instruction and a parameter adjustment instruction; and sending the maintenance instruction to an intelligent device or a maintenance personnel terminal corresponding to the maintenance instruction, and sending the parameter adjustment instruction to one or more target pipeline monitoring devices.

6 Claims, 5 Drawing Sheets

(58) Field of Classification Search
USPC .......................................................... 702/51
See application file for complete search history.

(56) References Cited

U.S. PATENT DOCUMENTS

| | | | | |
|---|---|---|---|---|
| 2021/0325005 | A1* | 10/2021 | Inoue | G01M 3/243 |
| 2021/0388950 | A1* | 12/2021 | Solomon | G06Q 10/20 |
| 2023/0167950 | A1* | 6/2023 | Shao | F17D 5/005 |
| | | | | 137/1 |
| 2023/0250924 | A1* | 8/2023 | Shao | G16Y 40/50 |
| | | | | 702/51 |
| 2024/0019086 | A1* | 1/2024 | Pirsiavash | G01N 17/00 |
| 2024/0318790 | A1 | 9/2024 | Shao et al. | |

FOREIGN PATENT DOCUMENTS

| | | | | | |
|---|---|---|---|---|---|
| CN | 114777034 | A | * | 7/2022 | F17D 5/06 |
| CN | 112799365 | B | | 8/2022 | |
| CN | 115774710 | A | | 3/2023 | |
| CN | 116951331 | A | * | 10/2023 | F17D 5/02 |
| CN | 116989274 | A | * | 11/2023 | F17D 5/02 |
| CN | 118012848 | A | | 5/2024 | |
| CN | 118536759 | A | | 8/2024 | |
| CN | 118608105 | A | | 9/2024 | |
| CN | 118935274 | A | | 11/2024 | |
| CN | 118941173 | A | | 11/2024 | |
| KR | 20180070330 | A | | 6/2018 | |
| KR | 20220078301 | A | | 6/2022 | |
| KR | 102633564 | B1 | * | 2/2024 | G01H 1/14 |
| KR | 102716454 | B1 | | 10/2024 | |

OTHER PUBLICATIONS

Notification to Grant Patent Right for Invention in Chinese Application No. 202411756628.4 mailed on Feb. 20, 2025, 5 pages.

Liu, Wei et al., Application and Prospect of Intelligent + Pipeline Integrity Management Methods, China Petroleum and Chemical Standard and Quality, 2020, 3 pages.

Xie, Nana et al., A Brief Discussion on the Management Measures for Third-party Construction Damage in the Integrity Management of Gas Pipelines, Science and Technology Innovation Herald, 2019, 5 pages.

"Online Monitoring System Solution for Gas Pipeline Network", Web page <https://www.top-iot.com/content-77-1076-1.html>, Jun. 16, 2021.

"What are the Differences Among RTU, DTU and Industrial Gateway", Web page <https://zhuanlan.zhihu.com/p/162198156>, Jul. 21, 2020.

"What are the Monitoring Indicators and Equipment for Natural Gas Pipelines?", Web page <https://baijiahao.baidu.com/s?id=1772451568338417984>, Jul. 26, 2023.

\* cited by examiner

METHODS, SYSTEMS, AND MEDIA FOR GAS PIPELINE SAFETY MONITORING BASED ON REGULATORY INTERNET OF THINGS

CROSS REFERENCE TO RELATED APPLICATIONS

This application claims priority to Chinese Patent Application 202411756628.4, filed on Dec. 3, 2024, the entire contents of which are incorporated herein by reference.

TECHNICAL FIELD

The present disclosure generally relates to the technical field of gas pipeline monitoring, and in particular, to a method, a system, and a medium for gas pipeline safety monitoring based on a regulatory Internet of Things (IoT).

BACKGROUND

Gas pipeline monitoring is a necessary part of ensuring gas safety. Collecting indicator data of gas through a pipeline monitoring device and issuing an alarm when the indicator data exceeds a preset threshold allows for timely maintenance of the gas pipeline when it is abnormal. But when the pipeline monitoring device malfunctions, it may lead to misreporting, false alarms, and other occurrences, generating unnecessary manual inspection costs.

To solve the above problem, CN109239265B proposes a method for detecting a failure of a monitoring device, which analyzes patterns of monitoring data of the monitoring device, determines the presence of abnormal data and consequently identifies whether the monitoring device has malfunctioned. This method effectively identifies a faulty monitoring device. However, the abnormal data may be caused by incidental factors (e.g., environmental factors, interference from human activities, etc.), rather than issues with the monitoring device itself. This leads to the low adaptability of the manner that determines device faults based on the monitoring data, sometimes manual inspection is still required.

Therefore, a method, a system and a medium for gas pipeline safety monitoring based on a regulatory Internet of Things (IoT) are provided, which can help to accurately monitor the working status of the pipeline monitoring device and timely detect a gas pipeline that may have faults, and thus improve the safety of the use of the gas pipeline.

SUMMARY

One of the embodiments of the present disclosure provides a method for gas pipeline safety monitoring based on a regulatory Internet of Things (IoT), wherein the method is implemented based on a smart gas company management platform of a system for gas pipeline safety monitoring based on a regulatory IoT, comprising: obtaining a first vibration sequence based on vibration data uploaded by a plurality of pipeline monitoring devices captured by a smart gas device object platform, the plurality of pipeline monitoring devices being deployed in different pipeline regions; obtaining construction information corresponding to each of the pipeline regions based on a smart gas government safety supervision and management platform, and determining a second vibration sequence based on the construction information and the first vibration sequence; receiving feedback information from a people user platform based on the smart gas government safety supervision and management platform; identifying a suspected leak point location based on the feedback information and the second vibration sequence; generating, based on the suspected leak point location, a maintenance instruction and a parameter adjustment instruction, wherein the maintenance instruction is configured to mobilize at least one of an intelligent device or maintenance personnel to maintain the suspected leak point location, and the parameter adjustment instruction is configured to adjust a monitoring parameter of one or more target pipeline monitoring devices; and sending the maintenance instruction to the intelligent device or a maintenance personnel terminal corresponding to the maintenance instruction via the smart gas device object platform, and sending the parameter adjustment instruction to the one or more target pipeline monitoring devices via the smart gas device object platform.

One of the embodiments of the present disclosure provides a system for gas pipeline safety monitoring based on a regulatory Internet of Things (IoT), wherein the system includes a people user platform, a smart gas government safety supervision service platform, a smart gas government safety supervision and management platform, a smart gas government safety supervision sensor network platform, a smart gas government safety supervision object platform, a gas user platform, a gas user service platform, a smart gas company sensor network platform, and a smart gas device object platform, the smart gas government safety supervision object platform includes a smart gas company management platform; the smart gas company management platform is configured to: obtain a first vibration sequence based on vibration data uploaded by a plurality of pipeline monitoring devices captured by the smart gas device object platform, the plurality of pipeline monitoring devices being deployed in different pipeline regions; obtain construction information corresponding to each of the pipeline regions based on the smart gas government safety supervision and management platform, and determine a second vibration sequence based on the construction information and the first vibration sequence; receive feedback information from the people user platform based on the smart gas government safety supervision and management platform; identify a suspected leak point location based on the feedback information and the second vibration sequence; generate, based on the suspected leak point location, a maintenance instruction and a parameter adjustment instruction, wherein the maintenance instruction is configured to mobilize at least one of an intelligent device or maintenance personnel to maintain the suspected leak point location, and the parameter adjustment instruction is configured to adjust a monitoring parameter of one or more target pipeline monitoring devices; and send the maintenance instruction to the intelligent device or a maintenance personnel terminal corresponding to the maintenance instruction via the smart gas device object platform, and send the parameter adjustment instruction to the one or more target pipeline monitoring devices via the smart gas device object platform.

One of the embodiments of the present disclosure provides a non-transitory computer-readable storage medium storing computer instructions, wherein when a computer reads the computer instructions in the storage medium, the computer executes the method for gas pipeline safety monitoring based on a regulatory Internet of Things (IoT).

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering denotes the same structure, wherein.

DETAILED DESCRIPTION

Figure 1:
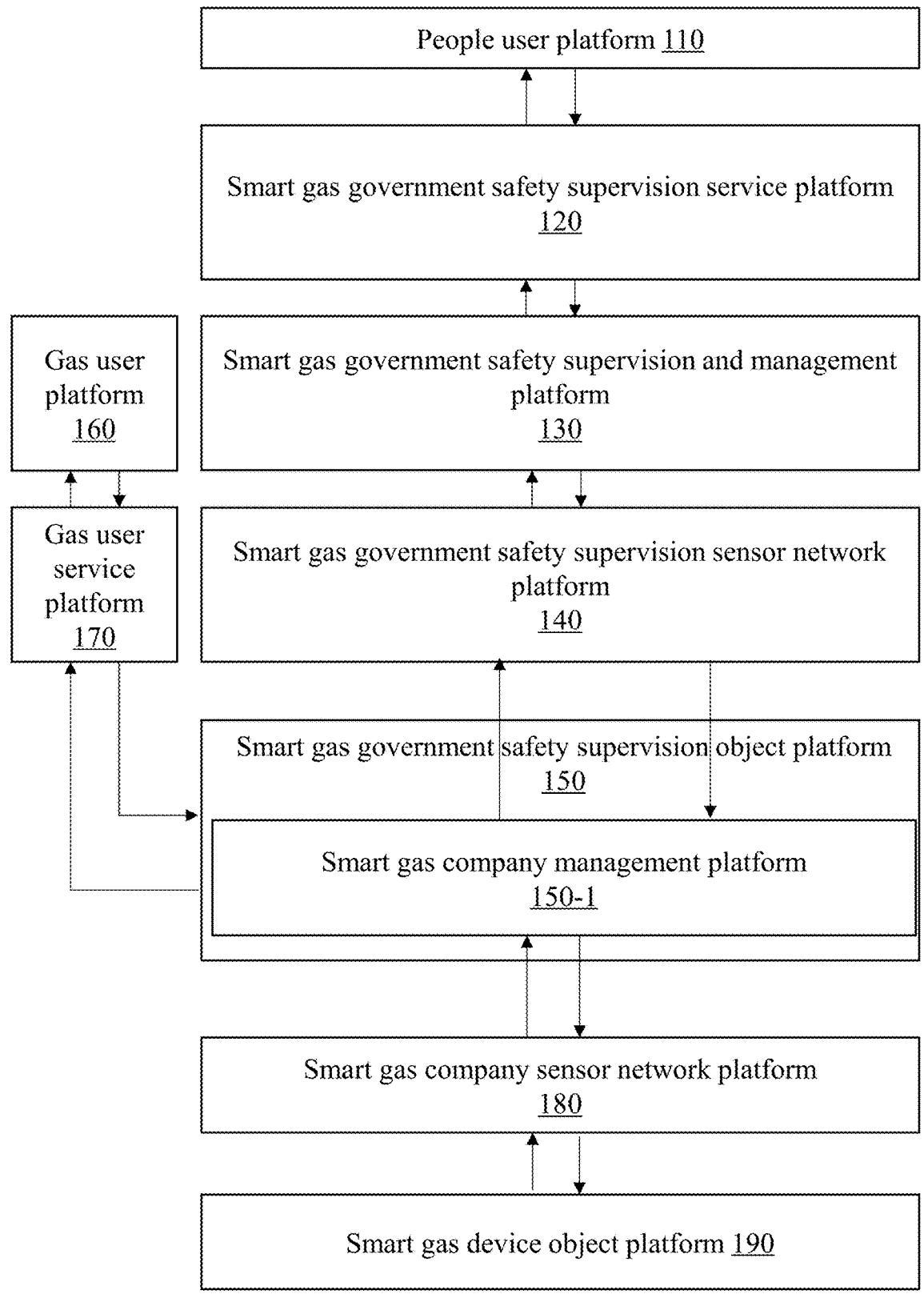
FIG. 1 is a schematic diagram illustrating platforms of a system for gas pipeline safety monitoring based on a regulatory Internet of Things (IoT) according to some embodiments of the present disclosure.

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to apply the present disclosure to other similar scenarios in accordance with these drawings without creative labor. Unless obviously obtained from the context or the context illustrates otherwise, the same numeral in the drawings refers to the same structure or operation.

It should be understood that the terms "system", "equipment", "unit" and/or "module" as used herein are a method to distinguish between different components, elements, parts, sections or assemblies at different levels. However, the words may be replaced by other expressions if other words accomplish the same purpose.

As shown in the present disclosure and the claims, unless the context clearly suggests an exception, the words "one," "a", "an", "and/or "the" do not refer specifically to the singular, but may also include the plural. Generally, the terms "including" and "comprising" suggest only the inclusion of clearly identified steps and elements, and these steps and elements do not constitute an exclusive list, and the method or apparatus may also include other steps or elements.

Flowcharts are used in the present disclosure to illustrate operations performed by a system in accordance with the embodiments of the present disclosure. It should be appreciated that the preceding or following operations are not necessarily performed in an exact sequence. Instead, steps may be processed in reverse order or simultaneously. Additionally, it is possible to add other operations to these processes or remove one or more steps from them.

In order to ensure the safety of the gas pipeline, it is necessary to detect the malfunctioning gas pipeline in a timely manner. A pipeline monitoring device may monitor gas pipelines and provide early warning of possible gas pipeline failures. Because the pipeline monitoring device may lead to misreporting, false alarms, and other occurrences, manual inspections are required to monitor the working status of the pipeline monitoring device, and the labor cost is high. CN109239265B can more accurately determine a faulty pipeline monitoring device by analyzing monitoring data of the monitoring device. However, the influence of incidental factors on the monitoring data is not taken into account, and it is not possible to remotely monitor the working status of the pipeline monitoring device.

In view of the above, some embodiments of the present disclosure determine a suspected leak point location based on vibration data uploaded by the pipeline monitoring device and combined with data such as construction information, feedback information, or the like, and generate a maintenance instruction and a parameter adjustment instruction based on the suspected leak point location. This helps to accurately monitor the working status of the pipeline monitoring device and make adjustments to timely investigate gas pipelines that may have malfunctioned, reducing unnecessary manual investigation while ensuring the safety of gas pipeline operation.

FIG. 1 is a schematic diagram illustrating platforms of a system for gas pipeline safety monitoring based on a regulatory Internet of Things (IoT) according to some embodiments of the present disclosure.

As shown in FIG. 1, the system 100 for gas pipeline safety monitoring based on a regulatory IoT may include a people user platform 110, a smart gas government safety supervision service platform 120, a smart gas government safety supervision and management platform 130, a smart gas government safety supervision sensor network platform 140, a smart gas government safety supervision object platform 150, a gas user platform 160, a gas user service platform 170, a smart gas company sensor network platform 180, and a smart gas device object platform 190.

The people user platform 110 refers to a platform for interacting with users. The users are all citizens associated with (e.g., using) smart gas. In some embodiments, the people user platform 110 may engage in a bi-directional exchange of information with the users. For example, the users may obtain information or communicate a need via the people user platform 110. In some embodiments, the people user platform 110 may be configured as a terminal device. For example, the people user platform 110 may be a smartphone, a tablet, a laptop, or the like, or any combination thereof.

In some embodiments, the people user platform 110 may interact bi-directionally with the smart gas government safety supervision service platform 120. For example, the smart gas government safety supervision service platform 120 may obtain feedback information from the people user platform 110.

The smart gas government safety supervision service platform 120 refers to a platform for communicating needs and control information of the users. In some embodiments, the smart gas government safety supervision service platform 120 may interact bi-directionally with the people user platform 110.

The smart gas government safety supervision and management platform 130 refers to a platform that coordinates and harmonizes the connection and collaboration among various functional platforms and aggregates all the information of the IoT, providing the perception management and control management functions for the IoT operation system. The smart gas government safety supervision and management platform 130 may be set up on at least one distributed server. The distributed server may include storage equipment for supporting the operation of the integrated government regulatory database. In some embodiments, the smart gas government safety supervision and management platform 130 may interact bi-directionally with the smart gas government safety supervision service platform 120.

The smart gas government safety supervision sensor network platform 140 refers to a functional platform for managing sensor communications for the government. In some embodiments, the smart gas government safety supervision sensor network platform 140 may operate based on a communications network and be configured as a communication network, a gateway, or the like. In some embodiments, the smart gas government safety supervision sensor network platform 140 may implement sensing communication of sensing information and control information. In some embodiments, the smart gas government safety supervision sensor network platform 140 may interact bi-directionally with the smart gas government safety supervision and management platform 130.

The smart gas government safety supervision object platform 150 refers to an object platform for generating the sensing information and executing the control information.

In some embodiments, the smart gas government safety supervision object platform 150 includes a smart gas company management platform 150-1.

The smart gas company management platform 150-1 refers to a platform for performing a method of monitoring device for a smart gas pipeline. In some embodiments, the smart gas company management platform 150-1 may be set up on a gas company server. In some embodiments, the smart gas company management platform 150-1 may be configured as a processor; the processor may be a single server or a group of servers, and the group of servers may be centralized or distributed.

In some embodiments, the smart gas company management platform 150-1 is configured to: obtain a first vibration sequence based on vibration data uploaded by a plurality of pipeline monitoring devices captured by the smart gas device object platform; obtain construction information corresponding to each pipeline region based on the smart gas government safety supervision and management platform, and determine a second vibration sequence based on the construction information and the first vibration sequence; receive feedback information from the people user platform based on the smart gas government safety supervision and management platform; identify a suspected leak point location based on the feedback information and the second vibration sequence; generate, based on the suspected leak point location, a maintenance instruction and a parameter adjustment instruction; and send the maintenance instruction to an intelligent device or a maintenance personnel terminal corresponding to the maintenance instruction via the smart gas device object platform, and send the parameter adjustment instruction to one or more target pipeline monitoring devices via the smart gas device object platform.

In some embodiments, the smart gas company management platform 150-1 is further configured to: obtain a third vibration sequence based on vibration data uploaded by a plurality of pieces of peripheral equipment captured by the smart gas device object platform; determine a fourth vibration sequence based on the first vibration sequence and the third vibration sequence; determine a first suspected point location based on the feedback information and the second vibration sequence; determine a second suspected point location based on the feedback information and the fourth vibration sequence; and determine the suspected leak point location based on the first suspected point location and the second suspected point location.

In some embodiments, the smart gas company management platform 150-1 is further configured to: perform a first clustering on the first suspected point location to determine a plurality of first clustering centers; perform a second clustering on the second suspected point location to determine a plurality of second clustering centers; and determine each of the plurality of second clustering centers as the suspected leak point location, and determine each of the plurality of first clustering centers that satisfies a preset point location condition as the suspected leak point location.

In some embodiments, the smart gas company management platform 150-1 is further configured to: determine the fourth vibration sequence using a denoising model based on the first vibration sequence and the third vibration sequence, an input to the denoising model including the first vibration sequence, the third vibration sequence, equipment coordinates, and device coordinates, the denoising model being a machine learning model.

In some embodiments, the smart gas company management platform 150-1 is further configured to: identify a first region, a second region, and a third region based on a gas usage characteristic and the suspected leak point location; determine a maintenance instruction based on the first region; determine a first adjustment amount, a second adjustment amount, and a third adjustment amount in the parameter adjustment instruction based on the first region, the second region, the third region, and a system data load; and send the parameter adjustment instruction to the one or more target pipeline monitoring devices based on the smart gas device object platform, the parameter adjustment instruction being configured to adjust the target pipeline monitoring device within the first region by the first adjustment amount, adjust the target pipeline monitoring device within the second region by the second adjustment amount, and adjust the target pipeline monitoring device within the third region by the third adjustment amount.

In some embodiments, the smart gas company management platform 150-1 is further configured to: generate a plurality of sets of candidate adjustment amounts based on the system data load, each set of candidate adjustment amounts including a first candidate adjustment amount, a second candidate adjustment amount, and a third candidate adjustment amount; determine, for the each set of candidate adjustment amounts, a corresponding probability of fault omission using a scheduling model, inputs to the scheduling model include the first region, the second region, the third region, the first candidate adjustment amount, the second candidate adjustment amount, and the third candidate adjustment amount, the scheduling model being a machine learning model; and determine the first adjustment amount, the second adjustment amount, and the third adjustment amount in the parameter adjustment instruction based on the each set of candidate adjustment amounts and the probability of fault omission corresponding to the each set of candidate adjustment amounts.

In some embodiments, the smart gas company management platform 150-1 is further configured to: determine a resonance characteristic based on the second vibration sequence, the third vibration sequence, and the fourth vibration sequence; and determine an inverse resonance characteristic based on the resonance characteristic.

In some embodiments, the smart gas company management platform 150-1 may interact bi-directionally with the smart gas government safety supervision sensor network platform 140 and the gas user service platform 170 upward, and bi-directionally with the smart gas company sensor network platform 180 downward.

The gas user platform 160 refers to a platform for the users to interact with other users. In some embodiments, the gas user platform 160 may be configured as a terminal device. For example, the gas user platform 160 may be a smartphone, a tablet, a computer, or the like.

In some embodiments, the gas user platform 160 may interact bi-directionally with the gas user service platform 170.

The gas user service platform 170 refers to a platform for providing gas-related information to the users.

The smart gas company sensor network platform 180 refers to a comprehensive management platform for gas company sensing information. In some embodiments, the smart gas company sensor network platform 180 includes a communication base station, a router, and a wireless WiFi device. The smart gas company sensor network platform 180 may be disposed on a gas company communication device.

The smart gas device object platform 190 may be configured as various types of monitoring devices. For example, the smart gas device object platform 190 may include a gas flow meter, a pressure sensor, a temperature sensor, or the like. The smart gas device object platform 190 may be set up on a gas company server.

In some embodiments, the smart gas device object platform 190 may interact bi-directionally with the smart gas company sensor network platform 180. In some embodiments, the smart gas device object platform 190 may be communicatively connected with the plurality of pipeline monitoring devices based on a communication network.

In some embodiments, the smart gas device object platform 190 may include the maintenance personnel terminal. The maintenance personnel terminal refers to a terminal device corresponding to maintenance personnel, for example, a cell phone, a tablet, a computer, etc., used by the maintenance personnel. The maintenance personnel may perform maintenance on the gas pipeline based on the maintenance instruction received by the maintenance personnel terminal.

More details regarding each of the above platforms may be found in other contents of the present disclosure (e.g., descriptions in connection with FIG. 2-FIG. 5).

In some embodiments of the present disclosure, the system for gas pipeline safety monitoring based on a regulatory IoT can form an information operation closed loop among the people user platform, the smart gas government safety supervision service platform, the smart gas government safety supervision and management platform, the smart gas government safety supervision sensor network platform, the smart gas government safety supervision object platform, the gas user platform, the gas user service platform, the smart gas company sensor network platform, and the smart gas device object platform, and coordinate and operate regularly under the unified management of the smart gas company management platform, to realize the informatization and intelligence of the monitoring of device of the smart gas pipeline.

Figure 2:
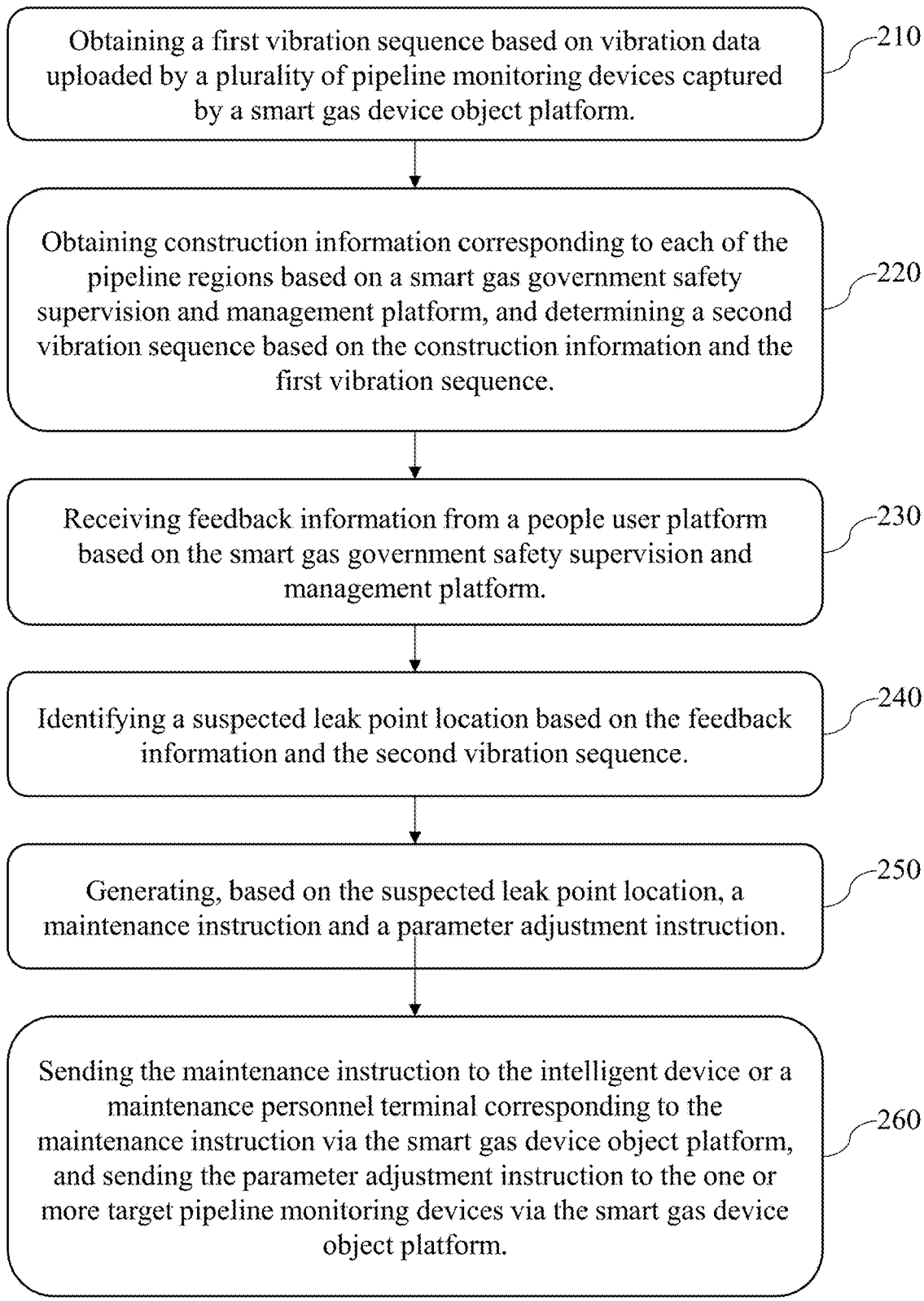
FIG. 2 is an exemplary flowchart illustrating a method for gas pipeline safety monitoring based on a regulatory Internet of Things (IoT) according to some embodiments of the present disclosure.

FIG. 2 is an exemplary flowchart illustrating a method for gas pipeline safety monitoring based on a regulatory Internet of Things (IoT) according to some embodiments of the present disclosure. In some embodiments, a process 200 may be performed by the smart gas company management platform 150-1 of the system 100 for gas pipeline safety monitoring based on a regulatory IoT. As shown in FIG. 2, the process 200 includes the following operations.

In 210, a first vibration sequence may be obtained based on vibration data uploaded by a plurality of pipeline monitoring devices captured by the smart gas device object platform. More details regarding the smart gas device object platform may be found in other contents of the present disclosure (e.g., descriptions in connection with FIG. 1).

The pipeline monitoring devices refer to devices used to monitor a gas pipeline. For example, the plurality of pipeline monitoring devices may include a flow sensor, a pressure sensor, a vibration sensor, or the like. The plurality of pipeline monitoring devices may be disposed on a surface of the gas pipeline.

In some embodiments, the plurality of pipeline monitoring devices are deployed in different pipeline regions.

In some embodiments, the smart gas company management platform may determine the pipeline regions corresponding to the plurality of pipeline monitoring device by querying a first preset table. The first preset table may include correspondences between the plurality of pipeline monitoring devices and a plurality of pipeline regions. The smart gas company management platform may establish the first preset table based on the correspondences between the plurality of pipeline monitoring devices and the plurality of pipeline regions in a design drawing of the gas pipeline.

The vibration data refers to data related to vibrations of the gas pipeline. For example, the vibration data may include, an amplitude of the gas pipeline. In some embodiments, the smart gas company management platform may interact with the plurality of pipeline monitoring devices based on the smart gas device object platform to obtain the vibration data that is captured by the plurality of pipeline monitoring devices and is uploaded to the smart gas device object platform.

The first vibration sequence refers to a sequence including different moments, point locations of different pipeline monitoring devices, and corresponding vibration data.

In some embodiments, the smart gas company management platform may construct the first vibration sequence based on the vibration data uploaded by the plurality of pipeline monitoring devices at different moments. For example, the vibration data uploaded by the plurality of pipeline monitoring devices captured by the smart gas company management platform includes: vibration data m11 and m21 of point locations a1 and a2 at the moment t1; and vibration data m12 and m22 of point locations a1 and a2 at the moment t2, and the first vibration sequence is constructed as ((a1, t1, m11), (a1, t2, m12), (a2, t1, m21), (a2, t2, m22)).

In 220, construction information corresponding to each of the pipeline regions may be obtained based on the smart gas government safety supervision and management platform, and a second vibration sequence may be determined based on the construction information and the first vibration sequence.

The construction information refers to information about possible construction situations around the pipeline regions. For example, the construction information may include information related to municipal construction, highway construction, railroad construction, and heavy vehicle traffic.

In some embodiments, the smart gas company management platform may access a government information disclosure website to obtain the construction information based on the smart gas government safety supervision and management platform.

In some embodiments, the smart gas company management platform may divide the pipeline regions corresponding to the construction information in a plurality of ways. For example, the smart gas company management platform may divide the pipeline regions based on municipal roads. As another example, the smart gas company management platform may divide the pipeline regions according to actual needs (e.g., pipeline density, etc.). Exemplarily, the smart gas company management platform may perform semantic matching or geographic location range matching based on the construction information and the municipal roads, to divide the pipeline regions corresponding to the construction information based on the municipal roads.

The second vibration sequence refers to a vibration sequence after removing vibration data corresponding to a construction time period from the first vibration sequence.

In some embodiments, the smart gas company management platform may determine the second vibration sequence based on the construction information and the first vibration sequence in a plurality of ways.

In some embodiments, the smart gas company management platform may determine the construction time period based on the construction information, and determine the second vibration sequence based on the construction time period and the first vibration sequence. For example, the smart gas company management platform may remove the vibration data corresponding to the point locations of the pipeline monitoring device in a construction range during the construction time period to obtain the second vibration sequence.

Exemplarily, the first vibration sequence is ((a1, t1, m11), (a1, t2, m12), (a2, t1, m21), (a2, t2, m22)), the municipal construction is performed at the moment t2, and the point location a1 is located within the construction range of the municipal construction, then the second vibration sequence is ((a1, t1, m11), (a2, t1, m21), (a2, t2, m22)).

The construction time period refers to a time period during which construction is performed. The smart gas company management platform may perform semantic matching based on the construction information to convert the construction information into information such as a construction coordinate, a vibration interference level, the construction time period, and the construction range.

The construction coordinate refers to a coordinate location at which the construction takes place.

The vibration interference level refers to a level of vibration interference to the gas pipeline during construction. The vibration interference level may include mild interference, moderate interference, and heavy interference. The smart gas company management platform may determine the corresponding vibration interference level based on a construction type corresponding to the construction information by querying a second preset table. The second preset table may include correspondences between different construction types and different vibration interference levels. The second preset table may be determined manually or by the system based on experience. For example, if the construction type is related to underground construction, the corresponding vibration interference level is heavy interference, and if the construction type is related to surface construction, the corresponding vibration interference level is mild interference. Exemplary types of underground construction may include repairing underground drains, and exemplary types of surface construction may include maintenance of electrical device.

In some embodiments, the smart gas company management platform may also determine the second vibration sequence based on the construction time period, the vibration interference level, and the first vibration sequence. For example, the smart gas company management platform may retain the vibration data during the construction time period of the mild and/or moderate interference and remove the vibration data during the construction time period of the heavy interference to obtain the second vibration sequence.

In 230, feedback information from the people user platform may be received based on the smart gas government safety supervision and management platform. More details regarding the smart gas government safety supervision and management platform and the people user platform may be found in other contents of the present disclosure (e.g., descriptions in connection with FIG. 1).

The feedback information refers to relevant feedback information provided by users regarding malfunctions of the gas pipeline and/or the pipeline monitoring device. For example, the feedback information may be that a particular pipeline monitoring device has been vandalized, that a particular formerly buried gas pipeline is leaking, etc.

In some embodiments, the smart gas company management platform may interact with the people user platform based on the smart gas government safety supervision and management platform to obtain the feedback information uploaded by the user to the people user platform.

In 240, a suspected leak point location may be identified based on the feedback information and the second vibration sequence.

The suspected leak point location refers to a point location on the gas pipeline where leaks, cracks, or other faults potentially occurs.

In some embodiments, the smart gas company management platform may identify the suspected leak point location based on the feedback information and the second vibration sequence in a plurality of ways.

For example, the smart gas company management platform may identify the point location of the pipeline monitoring device corresponding to the feedback information as a first set; identify the point location of the pipeline monitoring device corresponding to abnormal vibration data in the second vibration sequence as a second set; and identify the suspected leak point location by a first preset rule based on the first set and the second set.

The point location of the pipeline monitoring device corresponding to the feedback information may be a point location of the pipeline monitoring device involved in the feedback information, and a point location of the pipeline monitoring device provided in the gas pipeline involved in the feedback information. The smart gas company management platform may identify the vibration data in which the amplitude exceeds an amplitude threshold as the abnormal vibration data. The amplitude threshold may be preset based on historical experience.

The first preset rule refers to a preset rule for identifying the suspected leak point location based on the first set and the second set. Exemplary first preset rule may be: in response to a determination that a historical leak frequency of a gas pipeline network exceeds a first frequency threshold, identifying an intersection of the first set and the second set as the suspected leak point location; and in response to a historical leak frequency being lower than a second frequency threshold, identifying a union of the first set and the second set as the suspected leak point location.

The historical leak frequency refers to a frequency of leakage of pipelines in the gas pipeline network, which may be obtained based on the statistics of historical data. The first frequency threshold and the second frequency threshold may be preset by the system or by a human, and the first frequency threshold is higher than the second frequency threshold.

Figure 3:
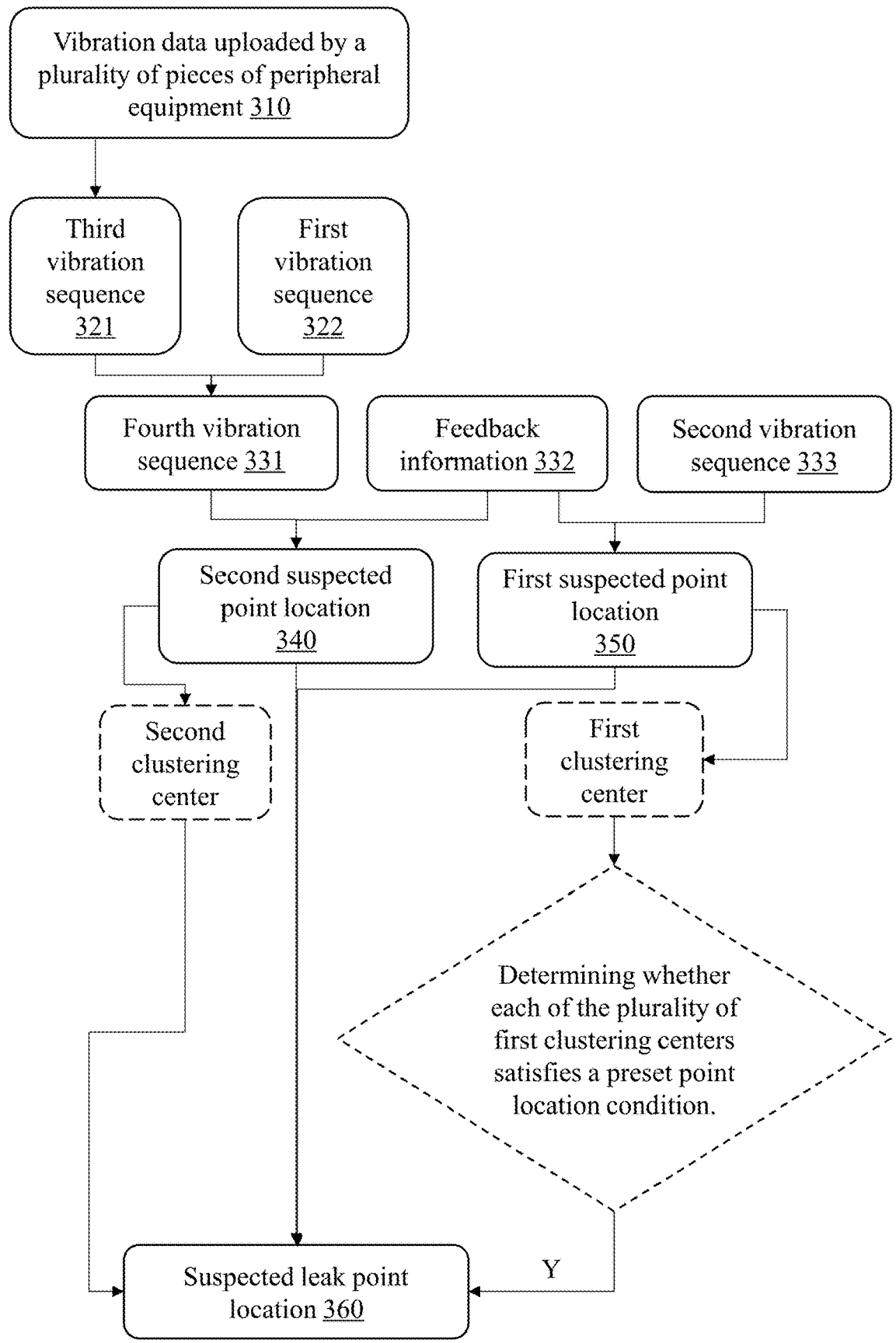
FIG. 3 is an exemplary schematic diagram illustrating a process for determining a suspected leak point location according to some embodiments of the present disclosure.

In some embodiments, the smart gas company management platform may identify the suspected leak point location based on a first suspected point location and a second suspected point location, and more details may be found other contents of the present disclosure (e.g., description in connection with FIG. 3).

In 250, a maintenance instruction and a parameter adjustment instruction may be generated based on the suspected leak point location.

The maintenance instruction refers to an instruction related to maintenance of the suspected leak point location. In some embodiments, the maintenance instruction may be configured to mobilize an intelligent device and/or maintenance personnel to perform maintenance on the suspected leak point location.

The intelligent device is used to maintain the suspected leak point location, such as a pipeline robot and a drone. The intelligent device may recognize the suspected leak point location and patrol them automatically.

In some embodiments, the smart gas company management platform may generate the maintenance instruction based on the suspected leak point location. For example, when the suspected leak point location is a1, the smart gas company management platform may generate a maintenance instruction: there is a risk of pipeline leakage at point location a1, please perform maintenance.

The parameter adjustment instruction refers to an instruction configured to adjust monitoring parameters of one or more target pipeline monitoring devices.

The target pipeline monitoring devices refer to pipeline monitoring devices that have been deployed in the gas pipeline network. In some embodiments, the smart gas company management platform may interact with the smart gas government safety supervision and management platform to obtain the deployed pipeline monitoring device in the gas pipeline network stored by the storage device.

The monitoring parameters refer to parameters related to the monitoring of the gas pipeline network by the pipeline monitoring device, such as a monitoring accuracy and a monitoring frequency.

In some embodiments, the smart gas company management platform may generate the parameter adjustment instruction based on the suspected leak point location. For example, the smart gas company management platform may increase the monitoring accuracy and the monitoring frequency of the suspected leak point location by a preset accuracy adjustment amount and a preset frequency adjustment amount; and the preset accuracy adjustment amount and the preset frequency adjustment amount may be preset by the system or a human. Exemplarily, when the suspected leak point location is a1, the smart gas company management platform may generate a parameter adjustment instruction: there is a risk of pipeline leakage at point location a1, please increase the monitoring accuracy and the monitoring frequency of the pipeline monitoring device at the point location a1 by the preset accuracy adjustment amount and the preset frequency adjustment amount.

Figure 5:
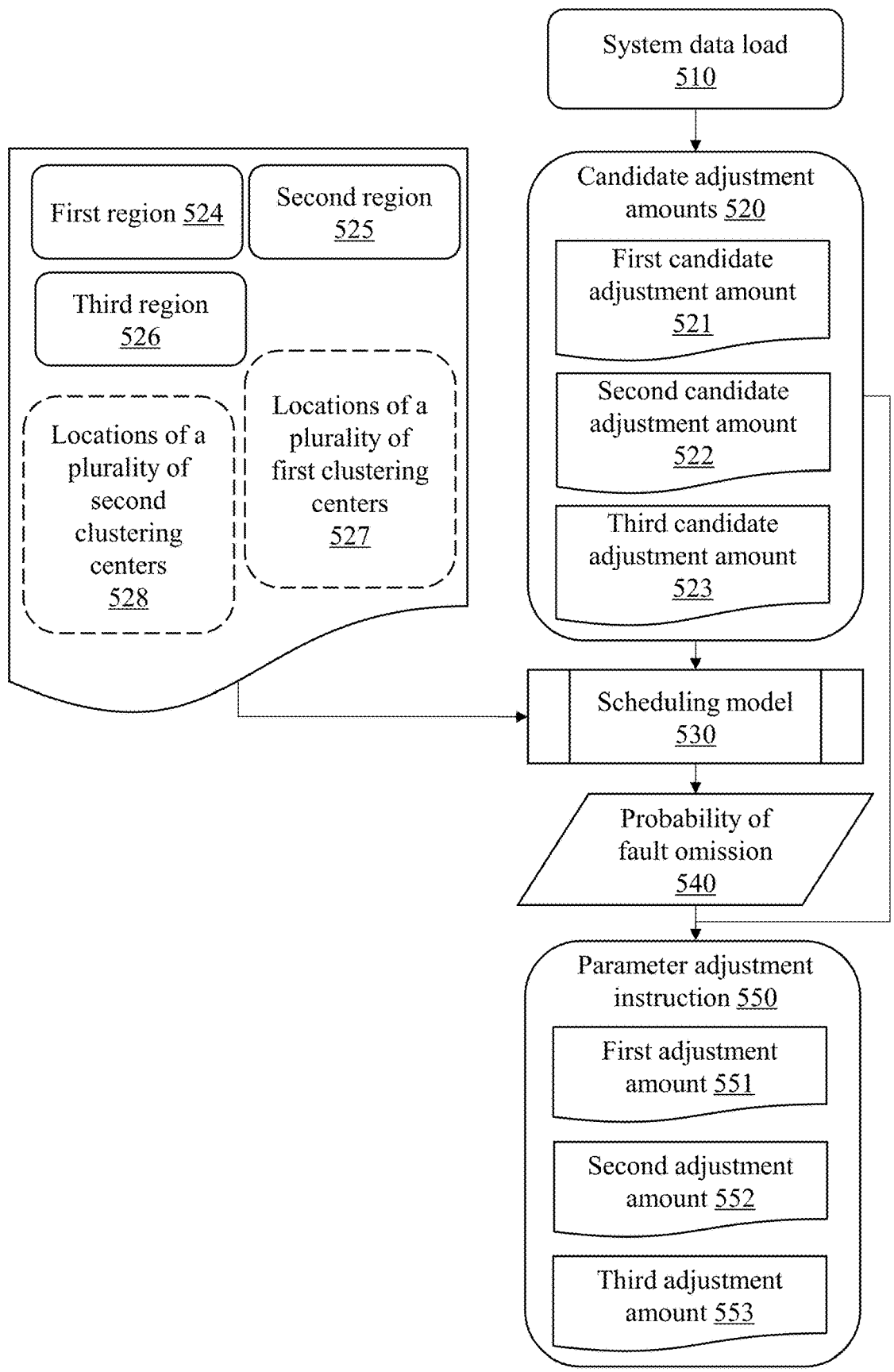
FIG. 5 is an exemplary schematic diagram illustrating a process for determining a parameter adjustment instruction according to some embodiments of the present disclosure.

In some embodiments, the smart gas company management platform may determine a first adjustment amount, a second adjustment amount, and a third adjustment amount in the parameter adjustment instruction based on each set of candidate adjustment amounts and a corresponding probability of fault omission, and more details may be found in other contents of the present disclosure (e.g., description in connection with FIG. 5).

In 260, the maintenance instruction may be sent to the intelligent device or a maintenance personnel terminal corresponding to the maintenance instruction via the smart gas device object platform, and the parameter adjustment instruction may be sent to the one or more target pipeline monitoring devices via the smart gas device object platform. More details regarding the smart gas device object platform may be found in other contents of the present disclosure (e.g., description in connection with FIG. 1).

In some embodiments, the smart gas company management platform may interact with the smart gas device object platform based on the smart gas company sensor network platform, send the maintenance instruction to the corresponding intelligent device, and send the parameter adjustment instruction to the corresponding target pipeline monitoring device; interact with the smart gas device object platform based on the smart gas company sensor network platform, and send the maintenance instruction to the corresponding maintenance personnel terminal in the smart gas device object platform. More details regarding the smart gas device object platform and the maintenance personnel terminal may be found in other contents of the present disclosure (e.g., description in connection with FIG. 1).

In some embodiments of the present disclosure, by identifying the suspected leak point location through the feedback information and the second vibration sequence, and generating the maintenance instruction and the parameter adjustment instruction based on the suspected leak point location, the working status of the pipeline monitoring device can be accurately monitored and adjustments can be performed while performing timely maintenance on the gas pipeline, which helps to ensure the safety of gas pipeline operation while reducing unnecessary manual troubleshooting.

In some embodiments, the smart gas company management platform may identify a first region, a second region, and a third region based on a gas usage characteristic and the suspected leak point location; determine the maintenance instruction based on the first region; determine the first adjustment amount, the second adjustment amount, and the third adjustment amount in the parameter adjustment instruction based on the first region, the second region, the third region, and a system data load; and send the parameter adjustment instruction to the one or more target pipeline monitoring devices based on the smart gas device object platform.

The gas usage characteristic refers to a characteristic related to gas usage, such as a time period of gas usage, a gas usage duration, and a unit usage. In some embodiments, the smart gas company management platform may obtain the gas usage characteristic recorded by a residential smart gas meter based on the smart gas device object platform.

The first region refers to a pipeline region including a higher abnormal risk (e.g., pipeline leaks, etc.).

The second region refers to a pipeline region including a lower abnormal risk.

The third region refers to a pipeline region including no abnormal risk. The division of the pipeline region may be found in the relevant description in the previous section of FIG. 2.

In some embodiments, the smart gas company management platform may identify the first region, the second region, and the third region based on the gas usage characteristic and the suspected leak point location in a plurality of ways.

In some embodiments, the smart gas company management platform may determine a point location count threshold based on the gas usage characteristic, and identify the first region, the second region, and the third region based on the point location count threshold and the suspected leak point location.

The point location count threshold refers to a threshold condition used to determine the first region based on a count of suspected leak point locations. The smart gas company management platform may determine the point location count threshold based on the time period of gas usage in the gas usage characteristic. For example, when the time period of gas usage is at a peak usage time, the point location count threshold is lower, and when the time period of gas usage is at an off-peak usage time, the point location count threshold is higher. The smart gas company management platform may determine the peak usage time and the off-peak usage time based on statistics of a plurality of residential smart gas meters.

In some embodiments, the smart gas company management platform may identify a pipeline region in which the count of suspected leak point locations exceeds the point location count threshold as the first region, identify a pipeline region in which the count of suspected leak point locations does not exceed the point location count threshold and is not 0 as the second region, and identify a pipeline region in which the count of suspected leak point locations is 0 as the third region.

In some embodiments, the smart gas company management platform may determine the maintenance instruction based on the first region. The smart gas company management platform may determine the maintenance instruction based on the suspected leak point location within the first region. For example, when the suspected leak point locations in the first region are a1 and a2, the smart gas company management platform may generate a maintenance instruction: there is a risk of pipeline leakage at the point locations a1 and a2 in the first region, so please prioritize the maintenance. The smart gas company management platform may adjust the processing order of a plurality of maintenance instructions and set the priority of the maintenance instruction that includes the suspected leak point location in the first region to the highest.

The system data load refers to a load of data processing performed by the smart gas IoT system. In some embodiments, the smart gas company management platform may determine the system data load based on the data that currently needs to be processed. The more data that needs to be processed, the greater the system data load.

The first adjustment amount refers to an increase in the monitoring parameter of the target pipeline monitoring device in the first region.

The second adjustment amount refers to an increase in the monitoring parameter of the target pipeline monitoring device in the second region.

The third adjustment amount refers to a reduction in the monitoring parameter of the target pipeline monitoring device in the third region.

In some embodiments, the smart gas company management platform may determine the first adjustment amount, the second adjustment amount, and the third adjustment amount in the parameter adjustment instruction based on the first region, the second region, the third region, and the system data load in a plurality of ways. For example, the larger the system data load, the larger the third adjustment amount, and the smaller the first adjustment amount and the second adjustment amount.

In some embodiments, the smart gas company management platform may generate the parameter adjustment instruction based on the first adjustment amount, the second adjustment amount, and the third adjustment amount, and based on the smart gas device object platform, send the parameter adjustment instruction to the one or more target pipeline monitoring devices. For example, the parameter adjustment instruction generated by the smart gas company management platform may be configured to adjust the target pipeline monitoring device in the first region with the first adjustment amount, adjust the target pipeline monitoring device in the second region with the second adjustment amount, and adjust the target pipeline monitoring device in the third region with the third adjustment amount.

In some embodiments of the present disclosure, the first region, the second region, and the third region are determined based on the gas usage characteristic and the suspected leak point location, and the adjustment amount of the target pipeline monitoring device in each region is determined by combining the system data load, which helps prioritize the maintenance of the pipeline regions with higher abnormal risks while avoiding excessive system computing load, improving the intelligence of device monitoring and pipeline maintenance.

In some embodiments, peripheral equipment of gas pipeline may include a vibration generator, and the vibration generator may generate a vibration based on an inverse resonance characteristic. In some embodiments, the smart gas company management platform may determine a resonance characteristic based on the second vibration sequence, a third vibration sequence, and a fourth vibration sequence; and determine the inverse resonance characteristic based on the resonance characteristic. More details regarding the peripheral equipment, the third vibration sequence, and the fourth vibration sequence may be found in other contents of the present disclosure (e.g., description in connection with FIG. 3).

The resonance characteristic refers to a characteristic related to the resonance generated by the gas pipeline, such as the intrinsic frequency and phase of the gas pipeline vibration.

In some embodiments, the smart gas company management platform may determine the resonance characteristic based on the second vibration sequence, the third vibration sequence, and the fourth vibration sequence in a plurality of ways.

For example, the smart gas company management platform may perform a spectrum analysis on the second vibration sequence, the third vibration sequence, and the fourth vibration sequence to obtain the resonance characteristic. Exemplary ways of the spectrum analysis may be data statistics, Fourier transform, or the like.

The inverse resonance characteristic refers to a correlation characteristic used to counteract the resonance characteristic. In some embodiments, the smart gas company management platform may determine the inverse resonance characteristic based on the resonance characteristic. For example, the smart gas company management platform may determine a characteristic that has the same frequency as the resonance characteristic but the opposite phase as the inverse resonance characteristic.

In some embodiments of the present disclosure, the inverse resonance characteristic is determined by the resonance characteristic, and the vibration generator in the peripheral equipment can emit vibrations based on the inverse resonance characteristic, effectively counteracting a resonance of the gas pipeline, reducing the impact of the resonance of the gas pipeline on determining the suspected leak point location, and improving the accuracy of the determination of the suspected leak point location.

FIG. 3 is an exemplary schematic diagram illustrating a process for determining a suspected leak point location according to some embodiments of the present disclosure.

In some embodiments, the smart gas company management platform may obtain a third vibration sequence 321 based on vibration data 310 uploaded by a plurality of pieces of peripheral equipment captured by the smart gas device object platform; determine a fourth vibration sequence 331 based on a first vibration sequence 322 and the third vibration sequence 321; determine a first suspected point location 350 based on feedback information 332 and a second vibration sequence 333; determine a second suspected point location 340 based on the feedback information 332 and the fourth vibration sequence 331; and determine a suspected leak point location 360 based on the first suspected point location 350 and the second suspected point location 340. More details regarding the vibration data, the first vibration sequence, the feedback information, the second vibration sequence, and the suspected leak point location may be found in other contents of the present disclosure (e.g., description in connection with FIG. 2).

The vibration data uploaded by the plurality of pieces of peripheral equipment refers to vibration data acquired by the plurality of pieces of peripheral equipment and uploaded to the smart gas device object platform. The vibration data acquired by the plurality of pieces of peripheral equipment is vibration data generated by the environment surrounding the gas pipeline.

The peripheral equipment refers to equipment deployed with the gas pipeline for monitoring vibrations in the environment surrounding the gas pipeline. For example, the peripheral equipment may include a vibration sensor, etc. It should be noted that the peripheral equipment is positioned at a distance from the gas pipeline. For example, when the gas pipeline is buried, the peripheral equipment may be disposed on the surface of the ground; and when the gas pipeline is exposed, the peripheral equipment may be disposed on the surface of the ground around the gas pipeline and not in contact with the gas pipeline.

In some embodiments, the peripheral equipment may acquire the vibration data with set acquisition parameters.

The acquisition parameters refer to parameters associated with the acquisition of the vibration data by the peripheral equipment. For example, the acquisition parameters may include time points, acquisition frequencies, or the like, when the plurality of pieces of peripheral equipment are turned on and/or off.

In some embodiments, the acquisition parameters may be related to a gas usage characteristic. More details regarding the gas usage characteristic may be found in other contents of the present disclosure (e.g., description in connection with operation 260 in FIG. 2).

In some embodiments, the larger the percentage of the peak period in the time period of gas usage, the longer the gas usage duration, and the greater the usage per unit time, the higher the acquisition frequency in the corresponding acquisition parameters.

In some embodiments of the present disclosure, the acquisition parameters are determined based on the gas usage characteristic, allowing for the flexible control of the acquisition parameters of the peripheral equipment in conjunction with actual gas usage, avoiding unnecessary acquisition of the vibration data by the peripheral equipment.

The third vibration sequence refers to a sequence consisting of the vibration data generated by the environment surrounding the gas pipeline received at the locations of the peripheral equipment. In some embodiments, the smart gas company management platform may construct the third vibration sequence based on the vibration data uploaded by the plurality of pieces of peripheral equipment at different moments. The data form and the process of constructing the third vibration sequence are similar to that of the first vibration sequence, and reference may be made to the relevant description of operation 210 in FIG. 2.

The fourth vibration sequence refers to a sequence consisting of vibration data generated by the gas pipeline itself (e.g., by the occurrence of a leak, etc.). The data form of the fourth vibration sequence is similar to that of the first vibration sequence, and reference may be made to the relevant description of operation 210 in FIG. 2.

In some embodiments, the smart gas company management platform may determine the fourth vibration sequence based on the first vibration sequence and the third vibration sequence in a plurality of ways. For example, the smart gas company management platform may determine the fourth vibration sequence based on the first vibration sequence and the third vibration sequence, through a preset algorithm. Exemplary preset algorithm may be Fourier transforms, etc. The vibration data acquired by a pipeline monitoring device in the first vibration sequence is a superposition of the vibration generated by the pipeline itself and the vibration generated by the external environment; the vibration data acquired by the peripheral equipment in the third vibration sequence is the vibration generated by the external environment. Through the preset algorithm, the superposition effect of the vibration generated by the pipeline itself and the vibration generated by the external environment may be stripped off to obtain the vibration data generated by the pipeline itself in the fourth vibration sequence.

Figure 4:
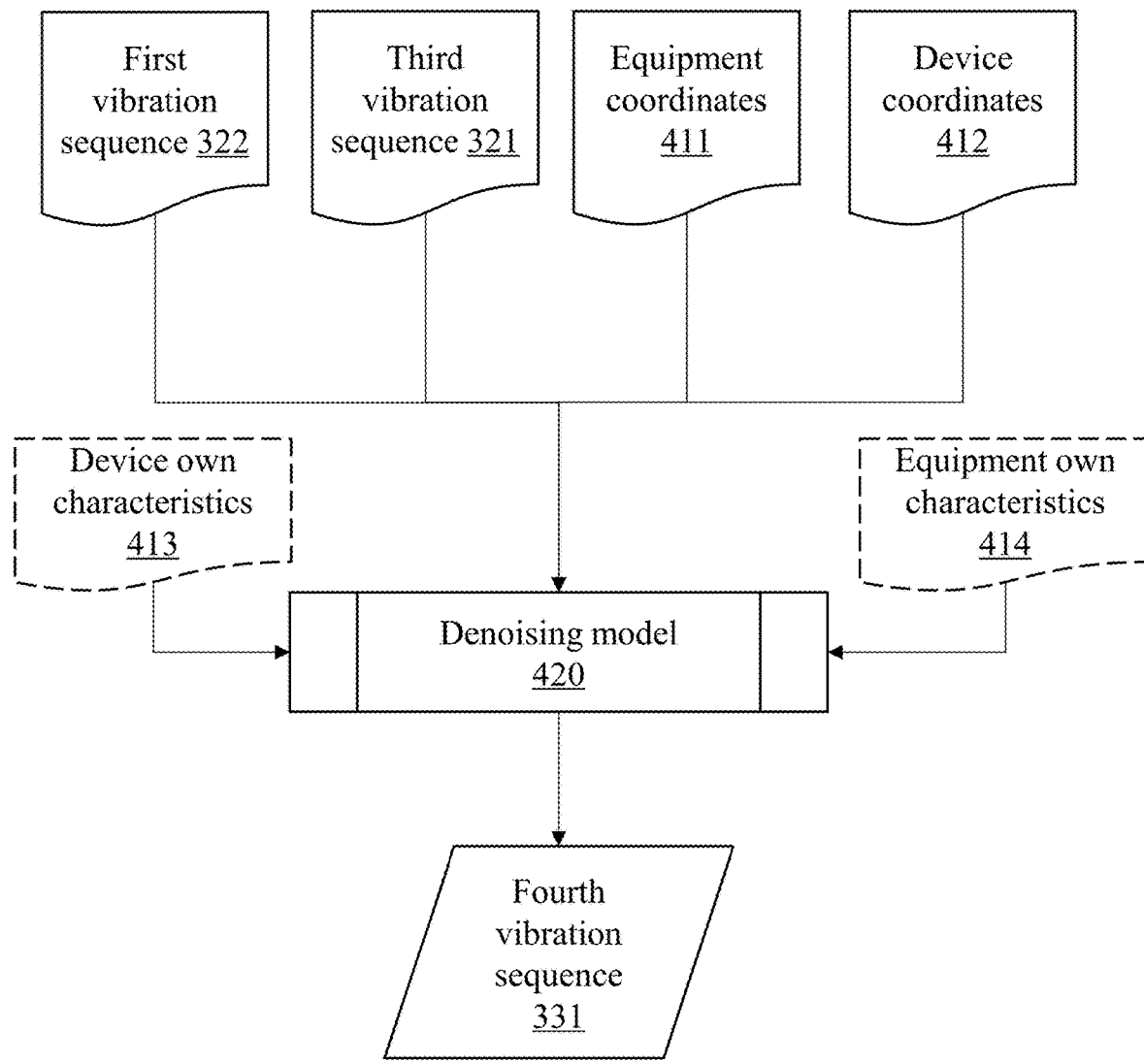
FIG. 4 is an exemplary schematic diagram illustrating a denoising model according to some embodiments of the present disclosure.

In some embodiments, the smart gas company management platform may determine the fourth vibration sequence based on a denoising model, and more details regarding the denoising model may be found in other contents of the present disclosure (e.g., description in connection with FIG. 4).

The first suspected point location refers to a point location capable of being the suspected leak point location, which is acquired based on the second vibration sequence.

The second suspected point location refers to a point location capable of being the suspected leak point location, which is acquired based on the fourth vibration sequence.

In some embodiments, the smart gas company management platform may determine the first suspected point location based on the feedback information and the second vibration sequence; and determine the second suspected point location based on the feedback information and the third vibration sequence. The first suspected point location and the second suspected point location are determined in a manner similar to the manner of determining the suspected leak point location, and reference may be made to the relevant description of operation 240 in FIG. 2.

In some embodiments, the smart gas company management platform may determine the suspected leak point location based on the first suspected point location and the second suspected point location in a plurality of ways. For example, the smart gas company management platform may determine a union of the first suspected point location and the second suspected point location as the suspected leak point location.

In some embodiments, the smart gas company management platform may perform a first clustering on the first suspected point location to determine a plurality of first clustering centers; perform a second clustering on the second suspected point location to determine a plurality of second clustering centers; and determine each of the plurality of second clustering centers as the suspected leak point location, and determine each of the plurality of first clustering centers that satisfies a preset point location condition as the suspected leak point location.

The first clustering refers to a clustering algorithm that clusters a plurality of first suspected point locations in a pipeline region to obtain the plurality of first clustering centers.

A first clustering center refers to a central point location that represents a plurality of first suspected point locations within the pipeline region. In some embodiments, the smart gas company management platform may perform the first clustering on the plurality of first suspected point locations to determine the plurality of first clustering centers. The first clustering may be a plurality of feasible clustering algorithms, such as hierarchical clustering, K-means clustering, or the like.

The second clustering refers to a clustering algorithm that clusters a plurality of second suspected point locations in the pipeline region to obtain the plurality of second clustering centers.

A second clustering center refers to a central point location that represents a plurality of second suspected point locations within the pipeline region. In some embodiments, the smart gas company management platform may perform the second clustering on the plurality of second suspected point locations to determine the plurality of second clustering centers. The second clustering may be a plurality of feasible clustering algorithms, such as hierarchical clustering, K-means clustering, or the like. The clustering algorithms for the second clustering and the first clustering may be the same or different.

The preset point location condition refers to a preset condition for determining whether the first clustering center is the suspected leak point location. In some embodiments, the preset point location condition may be that a distance between the first clustering center and at least one second clustering center is less than a preset distance threshold.

The preset distance threshold refers to a threshold condition that needs to be met by a distance between the at least one second clustering center and the first clustering center when the first clustering center is used as the suspected leak point location. The preset distance threshold may be set by the system or by a human.

In some embodiments, the preset distance threshold may be related to a count of the second clustering centers.

In some embodiments, the larger the count of the second clustering centers, the smaller the corresponding preset distance threshold.

The greater the count of the second clustering centers, the more likely the first clustering centers are to be close to the second clustering centers in terms of random probability. In some embodiments of the present disclosure, by negatively correlating the preset distance threshold to the count of the second clustering centers, the suspected leak point location in the first clustering centers can be more harshly selected when the count of the second clustering centers is greater, which improves the accuracy of the determination of the suspected leak point location.

Because the second clustering centers are determined based on the fourth vibration sequence, a confidence level of the second clustering centers as the suspected leak point location is higher than the first clustering centers. In some embodiments of the present disclosure, by determining each of the plurality of second clustering centers as the suspected leak point location, and by determining each of the plurality of first clustering centers that satisfies the preset point location condition as the suspected leak point location, the accuracy of the determination of the suspected leak point location can be improved, thereby reducing false alarms of the suspected leak point location.

In some embodiments of the present disclosure, determining the suspected leak point location by the first suspected point location and the second suspected point location can take into account the vibration of the surrounding environment of the gas pipeline network and the vibration of the gas pipeline network itself at the same time, which helps to improve the accuracy of the suspected leak point location.

FIG. 4 is an exemplary schematic diagram illustrating a denoising model according to some embodiments of the present disclosure.

In some embodiments, the smart gas company management platform may determine the fourth vibration sequence 331 using a denoising model 420 based on the first vibration sequence 322 and the third vibration sequence 321. More details regarding the first vibration sequence may be found in other contents of the present disclosure (e.g., description in connection with FIG. 2), more details regarding the third vibration sequence and the fourth vibration sequence may be found in other contents of the present disclosure (e.g., description in connection with FIG. 3).

The denoising model refers to a model for determining the fourth vibration sequence. In some embodiments, the denoising model may be a machine learning model. For example, the denoising model may be a neural network model, etc.

In some embodiments, an input to the denoising model may include the first vibration sequence 322, the third vibration sequence 321, equipment coordinates 411, and device coordinates 412.

The equipment coordinates refer to location coordinates corresponding to point locations of peripheral equipment in the third vibration sequence; and the device coordinates refer to location coordinates corresponding to point locations of pipeline monitoring devices in the first vibration sequence. The smart gas company management platform may interact with the smart gas government safety supervision and management platform to obtain the equipment coordinates and the device coordinates stored by a storage device.

In some embodiments, the input to the denoising model may further include device own characteristics 413 and equipment own characteristics 414.

The device own characteristics refer to characteristic information of the pipeline monitoring device itself corresponding to vibration data in the first vibration sequence, for example, a depth of burial of the pipeline monitoring device, soil environment where the pipeline monitoring device is located, or the like.

The equipment own characteristics refer to characteristic information of the peripheral equipment itself corresponding to vibration data in the third vibration sequence, for example, a depth of burial of the peripheral equipment, soil environment where the peripheral equipment is located, or the like.

The smart gas company management platform may interact with the smart gas government safety supervision and management platform to obtain the device own characteristics and the equipment own characteristics stored by the storage device.

The device own characteristics and the equipment own characteristics have an effect on the degree of vibration attenuation. In some embodiments of the present disclosure, the output fourth vibration sequence can be made more realistic by inputting the device own characteristics and the equipment own characteristics into the denoising model.

In some embodiments, the smart gas company management platform may obtain the denoising model by training based on a set of training samples. The set of training samples may include first training samples and first labels corresponding to the first training samples. For example, the smart gas company management platform may input a plurality of first training samples with the first labels into an initial denoising model to obtain outputs of the initial denoising model; construct a loss function based on the first labels and the outputs of the initial denoising model; iteratively update parameters of the initial denoising model based on the loss function by gradient descent or other manners; and obtain a trained denoising model when preset conditions are satisfied. The preset conditions may be that the loss function converges, a count of iterations reaches a threshold, or the like.

In some embodiments, the first training samples may include a sample first vibration sequence, a sample third vibration sequence, sample equipment coordinates, and sample device coordinates. The first training samples may be obtained based on experimental data. For example, vibration may be simulated in the vicinity of the peripheral equipment, the sample first vibration sequence may be constructed based on the vibration data recorded by the pipeline monitoring devices at the time of the simulated vibration, the sample third vibration sequence may be constructed based on the vibration data recorded by the peripheral equipment at the time of the simulated vibration, with the sample equipment coordinates and the sample device coordinates being the coordinates corresponding to the peripheral equipment and the pipeline monitoring devices as experimental objects. The peripheral equipment as the experiment objects may include the peripheral equipment corresponding to the vibration data in the sample third vibration sequence; and the pipeline monitoring devices as the experiment objects may include the pipeline monitoring devices corresponding to the vibration data in the sample first vibration sequence. An amount of the vibration data in the experimental data may be selected by a human and the sample first vibration sequence and the sample third vibration sequence may be constructed.

The first label is the fourth vibration sequence corresponding to the first training sample. The first label may be determined based on determinations of the experimental data. For example, the smart gas company management platform may determine the first label based on the sample first vibration sequence and the sample third vibration sequence in the experimental data by a Fourier transform or the like.

In some embodiments, when the input to the denoising model includes the device own characteristics and the equipment own characteristics, the first training sample may also include sample device own characteristics and sample equipment own characteristics. The smart gas company management platform may identify the own characteristics corresponding to the peripheral equipment and the pipeline monitoring devices that are designated as the experiment objects as the sample device own characteristics and the sample equipment own characteristics.

In some embodiments, the set of training samples for the denoising model may include a plurality of categories of training samples.

In some embodiments, the categories of the first training samples may be divided based on weather characteristics when the training samples are acquired.

The weather characteristics refer to characteristics related to weather conditions when the training samples are acquired. For example, the weather characteristics may include sunny days, rainy days, snowfall, thunder and lightning, high winds, or the like. The weather characteristics may be recorded manually when the training samples are acquired, or may be obtained by visiting a weather website.

In some embodiments, a percentage of training samples of each category is greater than a preset percentage.

The preset percentage refers to a preset percentage of the training samples of each category in the set of training samples. In some embodiments, the preset percentage may be preset by the system or by a human. The preset percentage of each of the plurality of categories of training samples may be the same or different.

In some embodiments, the smart gas company management platform may determine the preset percentage of the plurality of categories of training samples based on year-round weather characteristics. In the year-round weather characteristics, the higher the frequency of occurrence of a weather characteristic, the higher the preset percentage corresponding to the weather characteristic. The year-round weather characteristics may be obtained based on statistics of the weather characteristics from the past year.

In some embodiments of the present disclosure, training the denoising model with the plurality of categories of training samples, enables the denoising model to be applicable to a wide range of weather conditions, which ensures the accuracy of the output of the fourth vibration sequence under various weather characteristics.

In some embodiments of the present disclosure, determining the fourth vibration sequence by the denoising model can utilize the self-learning capability of the machine learning model to find a pattern from a large amount of data and quickly and accurately determine the fourth vibration sequence, which can help in subsequent determination of a suspected leak point location.

FIG. 5 is an exemplary schematic diagram illustrating a process for determining a parameter adjustment instruction according to some embodiments of the present disclosure.

In some embodiments, the smart gas company management platform may generate a plurality of sets of candidate adjustment amounts 520 based on a system data load 510; determine, for each set of candidate adjustment amounts, a corresponding probability of fault omission 540 using a scheduling model 530; and determine a first adjustment amount 551, a second adjustment amount 552, and a third adjustment amount 553 in a parameter adjustment instruction 550 based on the each set of candidate adjustment amounts and the probability of fault omission 540. More details regarding the system data load, the parameter adjustment instruction, the first adjustment amount, the second adjustment amount, and the third adjustment amount may be found in other contents of the present disclosure (e.g., descriptions in connection with FIG. 2 and FIG. 3).

The candidate adjustment amounts refer to adjustment amounts of candidate monitoring parameters. In some embodiments, the each set of candidate adjustment amounts includes the first candidate adjustment amount 521, the second candidate adjustment amount 522, and the third candidate adjustment amount 523, as shown in FIG. 5.

The first candidate adjustment amount refers to a first adjustment amount that may be used as an adjustment amount for a monitoring parameter of a target pipeline monitoring device in a first region.

The second candidate adjustment amount refers to a second adjustment amount that may be used as an adjustment amount for a monitoring parameter of a target pipeline monitoring device in a second region.

The third candidate adjustment amount refers to a third adjustment amount that may be used as an adjustment amount to a monitoring parameter of a target pipeline monitoring device in a third region.

In some embodiments, the smart gas company management platform may generate the plurality of sets of candidate adjustment amounts based on the system data load in a plurality of ways. For example, the smart gas company management platform may randomly generate the first candidate adjustment amount, the second candidate adjustment amount, and the third candidate adjustment amount within a preset generation condition. The preset generation condition refers to a preset condition for generating the candidate adjustment amounts based on the system data load. An exemplary preset generation condition may be that a total data amount corresponding to the first candidate adjustment amount, the second candidate adjustment amount, and the third candidate adjustment amount does not exceed a maximum data processing amount of the system data load. The maximum data processing amount refers to a maximum data processing amount of the system, which may be obtained through configuration information of the smart gas company management platform.

The scheduling model refers to a model for determining the probability of fault omission. In some embodiments, the scheduling model may be a machine learning model, such as deep neural networks (DNN), or the like.

In some embodiments, inputs to the scheduling model may include the first region 524, the second region 525, the third region 526, the first candidate adjustment amount 521, the second candidate adjustment amount 522, and the third candidate adjustment amount 523; outputs may include the probability of fault omission 540. The first region, the second region, and the third region may be represented in a form of coordinates. More details regarding the first region, the second region, and the third region and their determinations may be found in other contents of the present disclosure (e.g., description in connection with FIG. 2).

In some embodiments, the inputs to the scheduling model may further include locations 527 of a plurality of first clustering centers and locations 528 of a plurality of second clustering centers. The locations of the plurality of first clustering centers and the locations of the plurality of second clustering centers may be represented as in a form of coordinates.

More details regarding the first clustering centers, the second clustering centers and their locations may be found in other contents of the present disclosure (e.g., description in connection with FIG. 3).

In some embodiments of the present disclosure, the accuracy of the probability of fault omission output by the scheduling model can be improved by using the locations of the first clustering centers and the locations of the second clustering centers as inputs to the scheduling model.

The probability of fault omission refers to a probability of missing the suspected leak point location.

In some embodiments, the scheduling model may be obtained by training based on second training samples with second labels. The training of the scheduling model is similar to the training of the denoising model, and reference may be made to the relevant description of FIG. 4.

In some embodiments, the second training samples may include a sample first region, a sample second region, a sample third region, a sample first adjustment amount, a sample second adjustment amount, and a sample third adjustment amount; and the second training samples may be acquired based on the historical data.

The second labels may be a value of 0 or 1. A second label of 1 means that there is an unrecognized suspected leak point location after adjusting according to the second training samples; a second label of 0 means that there is no unrecognized suspected leak point location after adjusting according to the second training samples. The second labels may be determined based on a fault backtracking analysis of the suspected leak point location, and the second labels may be manually labeled.

In some embodiments, when the inputs to the scheduling model further include the locations of the plurality of first clustering centers and the locations of the plurality of second clustering centers, the second training samples may further include locations of a plurality of sample first clustering centers and locations of a plurality of sample second clustering centers. The locations of the sample first clustering centers and the locations of the sample second clustering centers may be determined based on historical data.

In some embodiments, the smart gas company management platform may determine the first adjustment amount, the second adjustment amount, and the third adjustment amount in the parameter adjustment instruction based on the each set of candidate adjustment amounts and the corresponding probability of fault omission. The smart gas company management platform may determine the first candidate adjustment amount, the second candidate adjustment amount, and the third candidate adjustment amount corresponding to the candidate adjustment amount with the lowest probability of fault omission as the first adjustment amount, the second adjustment amount, and the third adjustment amount in the parameter adjustment instruction.

In some embodiments of the present disclosure, determining the probability of fault omission by the scheduling model, and combining the probability of fault omission to determine the first adjustment amount, the second adjustment amount, and the third adjustment amount in the parameter adjustment instruction helps to reduce the probability of missing judgment of the suspected leak point location after adjusting one or more target pipeline monitoring devices according to the first adjustment amount, the second adjustment amount, and the third adjustment amount.

The basic concepts have been described above, and it is apparent to those skilled in the art that the foregoing detailed disclosure serves only as an example and does not constitute a limitation of the present disclosure. While not expressly stated herein, a person skilled in the art may make various modifications, improvements, and amendments to the present disclosure. Those types of modifications, improvements, and amendments are suggested in the present disclosure, so those types of modifications, improvements, and amendments remain within the spirit and scope of the exemplary embodiments of the present disclosure.

Also, the present disclosure uses specific words to describe embodiments of the present disclosure. As in "an embodiment", "one embodiment", and/or "some embodiments of the present disclosure" means a feature, structure, or characteristic associated with at least one embodiment of the present disclosure. Accordingly, it should be emphasized and noted that two or more references in the present disclosure, at different locations, to "one embodiment" or "an embodiment" or "an alternative embodiment" do not necessarily refer to the same embodiment. In addition, certain features, structures, or characteristics in one or more embodiments of the present disclosure may be suitably combined.

Additionally, unless expressly stated in the claims, the order of the processing elements and sequences described herein, the use of numerical letters, or the use of other names are not intended to qualify the order of the processes and laminar flow hoods described herein. While some embodiments of the invention that are currently considered useful are discussed in the foregoing disclosure by way of various examples, it is to be understood that such details serve only illustrative purposes and that additional claims are not limited to the disclosed embodiments; rather, the claims are intended to cover all amendments and equivalent combinations that are consistent with the substance and scope of the embodiments of the present disclosure. For example, although the implementation of various components described above may be embodied in a hardware device, it may also be implemented as a software only solution, e.g., an installation on an existing server or mobile device.

Similarly, it should be noted that in order to simplify the presentation of the disclosure of the present disclosure, and thereby aid in the understanding of one or more embodiments of the invention, the foregoing descriptions of embodiments of the present disclosure sometimes group multiple features together in a single embodiment, accompanying drawings, or a description thereof. However, this method of disclosure does not imply that more features are required for the objects of the present disclosure than are mentioned in the claims. Rather, claimed subject matter may lie in less than all features of a single foregoing disclosed embodiment.

Some embodiments use numbers describing the number of components, attributes, and it should be understood that such numbers used in the description of embodiments are modified in some examples by the modifiers "approximately", "nearly", or "substantially". Unless otherwise noted, the terms "about," "approximately," or "substantially" indicate that a ±20% variation in the stated number is allowed. Correspondingly, in some embodiments, the numerical parameters used in the present disclosure and claims are approximations, which can change depending on the desired characteristics of individual embodiments. In some embodiments, the numerical parameters should take into account the specified number of valid digits and employ general place-keeping. While the numerical domains and parameters used to confirm the breadth of their ranges in some embodiments of the present disclosure are approximations, in specific embodiments such values are set to be as precise as possible within a feasible range.

For each of the patents, patent applications, patent application disclosures, and other materials cited in this present disclosure, such as articles, books, specification sheets, publications, documents, etc., the entire contents of which are hereby incorporated herein by reference. Application history documents that are inconsistent with or conflict with the contents of this present disclosure are excluded, as are documents (currently or hereafter appended to this present disclosure) that limit the broadest scope of the claims of this present disclosure. It should be noted that in the event of any inconsistency or conflict between the descriptions, definitions, and/or use of terms in the materials appended to this present disclosure and those set forth herein, the descriptions, definitions and/or use of terms in this present disclosure shall prevail.

Finally, it should be understood that the embodiments described herein are only used to illustrate the principles of the embodiments of this present disclosure. Other deformations may also fall within the scope of this present disclosure. As such, alternative configurations of embodiments of the present disclosure may be viewed as consistent with the teachings of the present disclosure as an example, not as a limitation. Correspondingly, the embodiments of the present disclosure are not limited to the embodiments expressly presented and described herein.

What is claimed is:

1. A method for gas pipeline safety monitoring based on a regulatory Internet of Things (IoT), wherein the method is implemented based on a smart gas company management platform of a system for gas pipeline safety monitoring based on a regulatory Internet of Things (IoT), comprising:

obtaining a first vibration sequence based on vibration data uploaded by a plurality of pipeline monitoring devices captured by a smart gas device object platform, the plurality of pipeline monitoring devices being deployed in different pipeline regions, and the plurality of pipeline monitoring devices including a flow sensor, a pressure sensor, and a vibration sensor;

obtaining construction information corresponding to each of the pipeline regions based on a smart gas government safety supervision and management platform;

determining a construction time period based on the construction information, processing a first vibration sequence based on the construction period, and determining a second vibration sequence after removing vibration data corresponding to the construction time period;

receiving feedback information from a people user platform based on the smart gas government safety supervision and management platform, wherein the feedback information refers to relevant feedback information regarding malfunctions of a gas pipeline and/or the pipeline monitoring devices;

identifying a suspected leak point location based on the feedback information and the second vibration sequence, including:

obtaining a third vibration sequence based on vibration data uploaded by a plurality of pieces of peripheral equipment captured by the smart gas device object platform;

determining a fourth vibration sequence using a denoising model based on the first vibration sequence and the third vibration sequence, an input to the denoising model including the first vibration sequence, the third vibration sequence, equipment coordinates, and device coordinates, the denoising model being a machine learning model;

determining a first suspected point location based on the feedback information and the second vibration sequence; wherein the first suspected point location refers to a point location capable of being the suspected leak point location, which is acquired based on the second vibration sequence; determining a second suspected point location based on the feedback information and the fourth vibration sequence, wherein the second suspected point location refers to a point location capable of being the suspected leak point location, which is acquired based on the fourth vibration sequence; and determining a union of the first suspected point location and the second suspected point location as the suspected leak point location;

identifying a first region, a second region, and a third region based on a gas usage characteristic and the suspected leak point location; wherein the first region refers to a pipeline region including a higher abnormal risk, the second region refers to a pipeline region including a lower abnormal risk; and the third region refers to a pipeline region including no abnormal risk;

determining a maintenance instruction based on a suspected leak point location in the first region, wherein the maintenance instruction is configured to mobilize an intelligent device and/or maintenance personnel to perform maintenance on the suspected leak point location;

determining a first adjustment amount, a second adjustment amount, and a third adjustment amount in a parameter adjustment instruction based on the first region, the second region, the third region, and a system data load; the parameter adjustment instruction being configured to adjust a monitoring parameter of one or more target pipeline monitoring devices, including:

generating a plurality of sets of candidate adjustment amounts based on the system data load, each set of candidate adjustment amounts including a first candidate adjustment amount, a second candidate adjustment amount, and a third candidate adjustment amount;

determining, for the each set of candidate adjustment amounts, a corresponding probability of fault omission using a scheduling model, wherein inputs to the scheduling model include the first region, the second region, the third region, the first candidate adjustment amount, the second candidate adjustment amount, and the third candidate adjustment amount, the first region, the second region, and the third region are represented in a form of coordinates, and the scheduling model is a machine learning model;

determining the first adjustment amount, the second adjustment amount, and the third adjustment amount in the parameter adjustment instruction based on the each set of candidate adjustment amounts and the probability of fault omission corresponding to the each set of candidate adjustment amounts; and sending the maintenance instruction to the intelligent device or a maintenance personnel terminal corresponding to the maintenance instruction via the smart gas device object platform;

controlling the intelligent device and/or guiding the maintenance personnel to perform maintenance on the suspected leak point location based on the maintenance instruction, wherein the intelligent device is used to maintain the suspected leak point location, the intelligent device includes a pipeline robot and a drone, the maintenance personnel terminal includes a cell phone, a tablet, and a computer, and the controlling the intelligent device and/or guiding the maintenance personnel to perform maintenance on the suspected leak point location includes:

controlling, based on the maintenance instruction, the pipeline robot or the drone to capture and identify the suspected leak point location and to perform automatic patrol; and guiding the maintenance personnel to perform maintenance on the gas pipeline based on the maintenance instruction received by the maintenance personnel terminal, and sending the parameter adjustment instruction to the one or more target pipeline monitoring devices via the smart gas device object platform, and adjusting a monitoring accuracy and a monitoring frequency of the one or more target pipeline monitoring devices based on the parameter adjustment instruction, wherein the parameter adjustment instruction is configured to control the smart gas device object platform to adjust a monitoring accuracy and a monitoring frequency of a target pipeline monitoring device within the first region by the first adjustment amount, adjust a monitoring accuracy and a monitoring frequency of a target pipeline monitoring device within the second region by the second adjustment amount, and adjust a monitoring accuracy and a monitoring frequency of a target pipeline monitoring device within the third region by the third adjustment amount.

2. A non-transitory computer-readable storage medium storing computer instructions, wherein when a computer reads the computer instructions in the storage medium, the computer executes the method for gas pipeline safety monitoring based on a regulatory Internet of Things (IoT) in claim 1.

3. The method of claim 1, wherein the peripheral equipment refers to an equipment deployed with the gas pipeline for monitoring vibrations in environment surrounding the gas pipeline, the peripheral equipment includes the vibration sensor, the peripheral equipment acquires the vibration data with set acquisition parameters, the acquisition parameters includes time points and acquisition frequencies when a plurality of pieces of peripheral equipments are turned on and/or off, and the acquisition parameters are related to the gas usage characteristic.

4. The method of claim 1, wherein the peripheral equipment of gas pipeline includes a vibration generator, and the method further includes:

determining a resonance characteristic based on the second vibration sequence, the third vibration sequence, and the fourth vibration sequence;

determining an inverse resonance characteristic based on the resonance characteristic; and controlling the vibration generator to generate a vibration based on the inverse resonance characteristic.

5. The method of claim 1, wherein the denoising model is a neural network model, and the method further includes:

obtaining the denoising model by training based on a set of training samples, the set of training samples including a plurality of first training samples and first labels corresponding to the first training samples, wherein the training of the denoising model includes:

inputting the plurality of first training samples with the first labels into an initial denoising model to obtain outputs of the initial denoising model;

constructing a loss function based on the first labels and the outputs of the initial denoising model;

iteratively updating parameters of the initial denoising model based on the loss function by gradient descent; and obtaining a trained denoising model when preset conditions are satisfied, wherein the preset conditions include the loss function converges, and a count of iterations reaches a threshold, the set of training samples includes a plurality of categories of training samples, the preset percentages of each of the plurality of categories of training samples are different, the categories of the first training samples are divided based on weather characteristics when the training samples are acquired, and each category is greater than a preset percentage.

6. A system for gas pipeline safety monitoring based on a regulatory Internet of Things (IoT), wherein the system includes a people user platform, a smart gas government safety supervision service platform, a smart gas government safety supervision and management platform, a smart gas government safety supervision sensor network platform, a smart gas government safety supervision object platform, a smart gas company sensor network platform, and a smart gas device object platform, the smart gas government safety supervision object platform includes a smart gas company management platform; the smart gas company management platform is configured to:

obtain a first vibration sequence based on vibration data uploaded by a plurality of pipeline monitoring devices captured by the smart gas device object platform, the plurality of pipeline monitoring devices being deployed in different pipeline regions, and the plurality of pipeline monitoring devices includes a flow sensor, a pressure sensor, and a vibration sensor;

obtain construction information corresponding to each of the pipeline regions based on the smart gas government safety supervision and management platform;

determine a construction time period based on the construction information, process a first vibration sequence based on the construction period, and determine a second vibration sequence after removing vibration data corresponding to the construction time period;

receive feedback information from a people user platform based on the smart gas government safety supervision and management platform, wherein the feedback information refers to relevant feedback information regarding malfunctions of a gas pipeline and/or the pipeline monitoring devices;

identify a suspected leak point location based on the feedback information and the second vibration sequence, including:

obtaining a third vibration sequence based on vibration data uploaded by a plurality of pieces of peripheral equipment captured by the smart gas device object platform;

determining a fourth vibration sequence using a denoising model based on the first vibration sequence and the third vibration sequence, an input to the denoising model including the first vibration sequence, the third vibration sequence, equipment coordinates, and device coordinates, the denoising model being a machine learning model;

determining a first suspected point location based on the feedback information and the second vibration sequence; wherein the first suspected point location refers to a point location capable of being the suspected leak point location, which is acquired based on the second vibration sequence; determining a second suspected point location based on the feedback information and the fourth vibration sequence, wherein the second suspected point location refers to a point location capable of being the suspected leak point location, which is acquired based on the fourth vibration sequence; and determining a union of the first suspected point location and the second suspected point location as the suspected leak point location;

identify a first region, a second region, and a third region based on a gas usage characteristic and the suspected leak point location; wherein the first region refers to a pipeline region including a higher abnormal risk, the second region refers to a pipeline region including a lower abnormal risk; and the third region refers to a pipeline region including no abnormal risk;

determine a maintenance instruction based on a suspected leak point location in the first region, wherein the maintenance instruction is configured to mobilize an intelligent device and/or maintenance personnel to perform maintenance on the suspected leak point location;

determine a first adjustment amount, a second adjustment amount, and a third adjustment amount in a parameter adjustment instruction based on the first region, the second region, the third region, and a system data load; the parameter adjustment instruction being configured to adjust a monitoring parameter of one or more target pipeline monitoring devices, including:

generating a plurality of sets of candidate adjustment amounts based on the system data load, each set of candidate adjustment amounts including a first candidate adjustment amount, a second candidate adjustment amount, and a third candidate adjustment amount;

determining, for the each set of candidate adjustment amounts, a corresponding probability of fault omission using a scheduling model, wherein inputs to the scheduling model include the first region, the second region, the third region, the first candidate adjustment amount, the second candidate adjustment amount, and the third candidate adjustment amount, the first region, the second region, and the third region are represented in a form of coordinates, and the scheduling model is a machine learning model;

determining the first adjustment amount, the second adjustment amount, and the third adjustment amount in the parameter adjustment instruction based on the each set of candidate adjustment amounts and the probability of fault omission corresponding to the each set of candidate adjustment amounts; and sending the maintenance instruction to the intelligent device or a maintenance personnel terminal corresponding to the maintenance instruction via the smart gas device object platform;

controlling the intelligent device and/or guiding the maintenance personnel to perform maintenance on the suspected leak point location based on the maintenance instruction, wherein the intelligent device is used to maintain the suspected leak point location, the intelligent device includes a pipeline robot and a drone, the maintenance personnel terminal includes a cell phone, a tablet, and a computer, and the controlling the intelligent device and/or guiding the maintenance personnel to perform maintenance on the suspected leak point location includes:

controlling, based on the maintenance instruction, the pipeline robot or the drone to capture and identify the suspected leak point location and to perform automatic patrol; and guiding the maintenance personnel to perform maintenance on the gas pipeline based on the maintenance instruction received by the maintenance personnel terminal, and sending the parameter adjustment instruction to the one or more target pipeline monitoring devices via the smart gas device object platform, and adjusting a monitoring accuracy and a monitoring frequency of the one or more target pipeline monitoring devices based on the parameter adjustment instruction, wherein the parameter adjustment instruction is configured to control the smart gas device object platform to adjust a monitoring accuracy and a monitoring frequency of a target pipeline monitoring device within the first region by the first adjustment amount, adjust a monitoring accuracy and a monitoring frequency of a target pipeline monitoring device within the second region by the second adjustment amount, and adjust a monitoring accuracy and a monitoring frequency of a target pipeline monitoring device within the third region by the third adjustment amount.

\* \* \* \* \*